(12) United States Patent
Hijar

(10) Patent No.: US 12,483,579 B1
(45) Date of Patent: Nov. 25, 2025

(54) OPTIMIZED CYBERSECURITY SYSTEM AND METHODS OF USE THEREOF

(71) Applicant: ProcureLinx, LLC, Arlington, VA (US)

(72) Inventor: Mark Hijar, Arlington, VA (US)

(73) Assignee: ProcureLinx, LLC, Arlington, VA (US)

( * ) Notice: Subject to any disclaimer, the term of this patent is extended or adjusted under 35 U.S.C. 154(b) by 0 days.

(21) Appl. No.: 19/020,133

(22) Filed: Jan. 14, 2025

Related U.S. Application Data

(60) Provisional application No. 63/728,268, filed on Dec. 5, 2024.

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC .................. H04L 63/1425; H04L 63/1441
USPC .......................................................... 726/23
See application file for complete search history.

(56) References Cited

U.S. PATENT DOCUMENTS

| 8,997,227 | B1* | 3/2015 | Mhatre | H04L 63/1416 726/23 |
|---|---|---|---|---|
| 11,349,911 | B1* | 5/2022 | Miles | H04L 67/1029 |
| 12,314,265 | B1* | 5/2025 | Liu | G06F 16/248 |
| 2017/0329808 | A1* | 11/2017 | Lachman | H04W 4/38 |
| 2023/0259632 | A1* | 8/2023 | Marciano | G06F 21/554 726/25 |
| 2024/0070236 | A1* | 2/2024 | Cella | G06Q 20/065 |

* cited by examiner

*Primary Examiner* — Badri Narayanan Champakesan
(74) *Attorney, Agent, or Firm* — GREENBERG TRAURIG, LLP

(57) ABSTRACT

In some embodiments, the present disclosure provides an exemplary method that may include steps of identifying a plurality of data packets from an external data source; determining at least one data type for each data packet of the plurality of data packets; validating the at least one data type of each data packet of the plurality of data packets; dynamically installing at least one prompt into at least one artificial intelligence-based software application within a computing device; and automatically resetting the at least one prompt in response to at least one trigger condition being met.

19 Claims, 9 Drawing Sheets

OPTIMIZED CYBERSECURITY SYSTEM AND METHODS OF USE THEREOF

CROSS-REFERENCE TO RELATED APPLICATIONS

This application claims the benefit, and priority benefit, of U.S. Provisional Patent Application Ser. No. 63/728,268, filed Dec. 5, 2024, titled "OPTIMIZED CYBERSECURITY SYSTEM AND METHODS OF USE THEREOF," the disclosure of which is incorporated by reference herein in its entirety.

STATEMENT REGRADING FEDERALLY SPONSORED RESEARCH OR DEVELOPMENT

Not applicable.

FIELD OF THE INVENTION

The present disclosure generally relates to an optimized cybersecurity system and methods of use thereof.

BACKGROUND OF TECHNOLOGY

Typically, a cyberattack is an intentional effort to steal, expose, alter, disable, or destroy data, applications, or other assets through unauthorized access to a network, computer system, or digital device.

Multiple studies have concluded that the vast majority of cyber breaches are the direct result of human error in the handling, transferring, storage, and deletion of data. Traditional computing system environments rely in large part on human intercession to define, categorize, and handle data introduced to and generated within the environment. This reliance on human handling of data creates continuing vulnerabilities to cyberattack and exponentially increases the potential for the unauthorized release or disclosure of confidential and/or controlled data maintained within the environment regardless of the security measures applied to the computing system environment itself.

SUMMARY OF DESCRIBED SUBJECT MATTER

In some embodiments, the present disclosure provides an exemplary technically improved computer-based method that includes at least the following steps: identifying, by a processor, a plurality of data packets from an external data source, the plurality of data packets including metadata associated with the external data source; determining, by the processor, at least one data type for each data packet of the plurality of data packets; validating, by the processor, the at least one data type of the data packet based on the metadata associated with the external data source to form at least one validated data packet; dynamically installing, by the processor, based on the at least one data type for the validated data packet, at least one prompt into at least one artificial intelligence-based software application within a computing device, wherein the at least one prompt is configured to facilitate a performance of at least one action associated with the at least one data type of the at least one validated data packet; and automatically resetting, by the processor, the at least one prompt in response to at least one trigger condition being met.

In some embodiments, the present disclosure provides an exemplary technically improved computer-based system that includes at least the following components of at least one processor configured to execute software instructions that cause the at least one processor to perform steps to: identify a plurality of data packets from an external data source, the plurality of data packets including metadata associated with the external data source; determine at least one data type for each data packet of the plurality of data packets; validate the at least one data type of the data packet based on the metadata associated with the external data source to form at least one validated data packet; dynamically install based on the at least one data type for the validated data packet, at least one prompt into at least one artificial intelligence-based software application within a computing device, where the at least one prompt is configured to facilitate a performance of at least one action associated with the at least one data type of the at least one validated data packet; and automatically reset the at least one prompt in response to at least one trigger condition being met.

In some embodiments, the present disclosure provides an exemplary technically improved computer-based system that includes at least the following components of at least one processor configured to execute software instructions that cause the at least one processor to perform steps to: identify a plurality of data packets from an internal data source, the plurality of data packets including metadata associated with the internal data source; determine at least one data type for each data packet of the plurality of data packets; validate the at least one data type of the data packet based on the metadata associated with the internal data source to form at least one validated data packet; dynamically install based on the at least one data type for the validated data packet, at least one prompt into at least one artificial intelligence-based software application within a computing device, where the at least one prompt is configured to facilitate a performance of at least one action associated with the at least one data type of the at least one validated data packet; and automatically reset the at least one prompt in response to at least one trigger condition being met.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
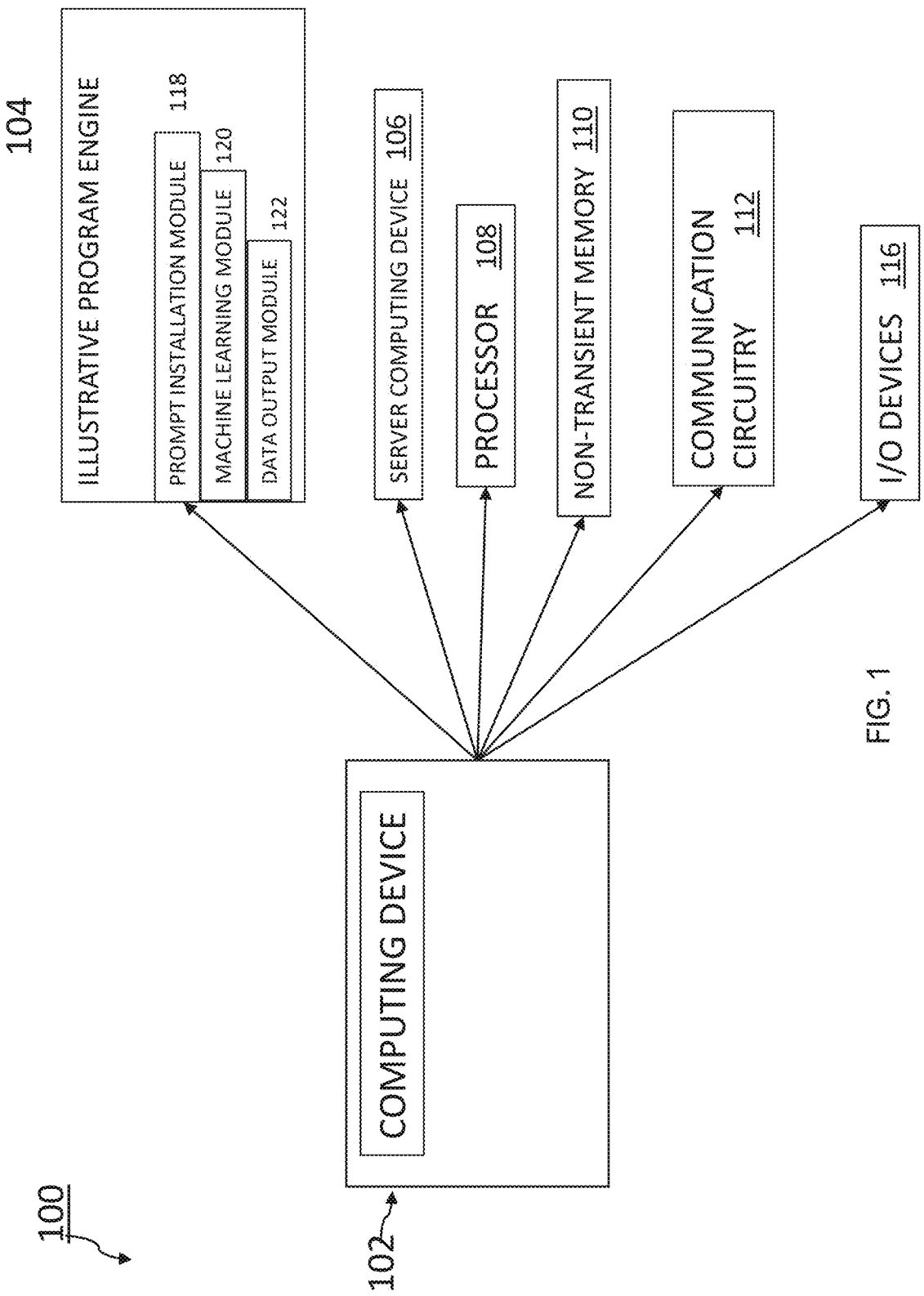
FIG. 1 depicts a block diagram of an exemplary computer-based system and platform for dynamically installing at least one prompt into at least one artificial intelligence-based software application within a computing device, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments of the present disclosure recognize technological computer-centered problems may arise when bad actors (i.e., hackers) attack artificial intelligence in application development. Typically, conventional hackers compromise platform function and access confidential data via phishing, spoofing, code injection, and reverse engineering type attacks. This exemplary technical problem may be exacerbated when hackers attempt to take advantage of the platform function through malware attacks using points of platform entry, creation of counterfeit keys to influence encryption process, and/or interception of activity data to decode encrypted data. The exemplary technical problem may be further exacerbated when hackers attempt prompt hacks on artificial intelligence in application development due to artificial intelligence prompts being deleted, altered, or replaced by the hackers. At least some embodiments of the present disclosure detail an illustrative computer-centric technological solution that may dynamically install at least one prompt into an artificial intelligence-based software application within a computing device and automatically resetting the at least one prompt in response to at least one trigger condition being met. In some embodiments, the at least one prompt may refer to common language directives within programmable AI functions. In the present disclosure, the technological solution can identify a plurality of data packets from an external data source, where the plurality of data packets may include metadata associated with the external data source. In the present disclosure, the technological solution can determine at least one data type for each data packet of the plurality of data packets. In the present disclosure, the technological solution can validate the at least one data type of each data package based on the metadata associated with the external data source to form at least one validated data packet. In the present disclosure, the technological solution can dynamically install the at least one prompt into at least one artificial intelligence-based software applications within a computing device based on the at least one data type for the validated data packet, where the at least one prompt is configured to facilitate a performance of at least one action associated with the at least one data type of the at least one validated data packet. In the present disclosure, the technological solution can automatically reset the at least one prompt in response to at least one trigger condition being met.

At least some embodiments of the present disclosure may be directed to address technological computer-centered problems that may arise when data created or stored in computer-based environments is mishandled (i.e., erroneously stored, released, transferred, or deleted in violation of applicable laws and regulations) within the environment by human users and/or is needlessly retained ("remembered") by artificial intelligence during application training and prompt-directed task performance. Typically, human users may be entrusted with the primary responsibility of data management within traditional computer-based environment; for example, some statistics estimated that 95% of cyber hacks may be the direct result of human error during data management. This exemplary technical problem may be exacerbated when specific types of data are subject to enhanced security precautions, including but not limited to covered defense information (CDI) covered by the National Institute of Standards and Technology (NIST) standard 800-171 (and federal acquisition regulations) and patient data covered by the Health Insurance Portability and Accountability Act (HIPAA). The exemplary technical problem may be further exacerbated when artificial intelligence in application development and task execution "learns" data that is covered by confidentiality terms and/or enhanced legal protections; this "learned" data is "remembered" (i.e., stored for future use) by the artificial intelligence application, which may violate one or more legal protections applicable to that data. In some embodiments, the at least one prompt may refer to common language directives within programmable AI functions. In the present disclosure, one exemplary technological solution can identify a plurality of data packets from an internal data source, where the plurality of data packets may include metadata associated with the internal data source. In the present disclosure, yet another technological solution can determine at least one data type for each data packet of the plurality of data packets. In the present disclosure, yet another technological solution can validate the at least one data type of each data package based on the metadata associated with the internal data source to form at least one validated data packet. In the present disclosure, yet another technological solution can dynamically install the at least one prompt into at least one artificial intelligence-based software applications within a computing device based on the at least one data type for the validated data packet, where the at least one prompt is configured to facilitate a performance of at least one action associated with the at least one data type of the at least one validated data packet, including but not limited to transfer to a prompt-directed secure internal source or disassembled into subdata (e.g., "forgotten"). In the present disclosure, yet another technological solution can automatically reset the at least one prompt in response to at least one trigger condition being met. In at least some embodiments, without limitations, a plurality of above-described technical solutions may be combined into a multi-functional technical solution.

FIG. 1 depicts a block diagram of an exemplary computer-based system and platform for dynamically installing at least one prompt into at least one artificial intelligence-based software application within a computing device, in accordance with one or more embodiments of the present disclosure.

In some embodiments, a computing system 100 may include a computing device 102 associated with a user and an illustrative program engine 104. In some embodiments, the program 104 may be stored on the computing device 102 such as, without limitation a calling-enabled computing device (e.g., smart phone, iPad™ with calling capability, laptop with calling capability, etc.). In some embodiments, the illustrative program engine 104 may reside, partially or in full, on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, a second or external computing device (not shown) may communicate with the computing device 102.

In some embodiments, the illustrative program engine 104 may be configured to instruct the processor 108 to execute one or more software modules such as a prompt installation module 118, a machine learning module 120, and a data output module 122.

In some embodiments, an exemplary prompt installation module 118, of the present disclosure, utilizes at least one machine learning algorithm described herein, to dynamically install at least one prompt into at least one artificial intelligence-based software application within the computing device 102; automatically resetting the at least one prompt in response to at least one trigger condition being met; and automatically either transferring the data to a secure internal source and/or erasing one or more data packets of the plurality of data packets associated with a particular data type. In some embodiments, the prompt may refer to a common language directive associated with AI programming functions within the computing device 102. In certain embodiments, the particular data type may refer to a type data associated with the installation and set-up of a computing device 102, where the types may include static data and fluid data. In certain embodiments, the static data may refer to data being monitored for unauthorized or unscheduled alteration during task-based activities. For example, the static data may refer to authorized sources of data, source code, and/or hard-coded prompts. In certain embodiments, the hard-coded prompts may refer to hard-coded artificial intelligence-based prompts. In certain embodiments, the fluid data may refer to data being monitored for source, size and format whether derived from an external and/or internal source. For example, the fluid data may refer to user-entered text, randomized external data; data derived from specific databases and/or software platforms within a computer-based environment; and data generated by and/or for unauthorized revision not required for subsequent task execution. In some embodiments, the external data source may refer to an externally installed application capable of encoding an original text message generated by a user through one or more unique translation keys. In some embodiments, the internal data source may refer to databases, documents, graphics, and other electronic and visual embodiments of data.

In some embodiments, the prompt installation module 118 may identify a plurality of data packets from an external data source, the plurality of data packets may include metadata associated with the internal and/or external data source. In certain embodiments, the plurality of data packets may refer to a container format for describing a coherent collection of data in a single package. In certain embodiments, the computing device 102 may be associated with a particular user, specifically a device associated with the particular user. In certain embodiments, the metadata may include internet protocol (IP) addresses, base-issued specifications, content of a data package, and a size of a data package. In certain embodiments, the prompt installation module 118 may provide support functions associated with anticipating, policing and/or neutralizing attempts by bad actors without human interruption to platform performance. In some embodiments, the prompt installation module 118 may consistently monitor and standardize at a particular data type to reduce and/or eliminate opportunities for bad actors to attack a system. In some embodiments, the prompt installation module 118 may consistently monitor and standardize a particular data type to ensure storage and/or erasure in accordance with associated prompts after completion of a task accessing the particular data type.

In some embodiments, the prompt installation module 118 may determine at least one data type for each data packet of the plurality of data packets. In certain embodiments, the prompt installation module 118 may determine the data type by analyzing each data packet for specific data; predicting a modification to the specific data in response to a condition; and verifying the modification via execution of the condition, where the condition may refer to a determination of the specific data being authorized or randomized. In certain embodiments, the analysis may refer to a trend analysis performed on the plurality of data packets and identify outliers based on spikes in size of particular data packets. In some embodiments, the prompt installation module 118 may validate the at least one data type each data package based on the metadata associated with the internal and/or external data source to form at least one validated data packet. The validated data packet may be formed in response to monitoring, recording, and validating an IP address associated with the computing device 102. In certain embodiments, the prompt installation module 118 may generate notice detailing an invalid IP address and may modify the data type associated with the specific data prior to processing within the application. In certain embodiments, the modification of the specific data may refer to an update to a particular data packet to learn additional metadata or validated data by a user and/or a base. In certain embodiments, the base-issued specification may refer to one or more standard definitions and/or interfaces for operating system environments and utilities. In certain embodiments, the validated data packet may contain validated content (i.e., symbol check) and relative size of the data packet. In certain embodiments, the data may be validated by the prompt installation module 118 in accordance with the dynamic application of experience gained by the module during ongoing task performance (e.g., the prompt installation module 118 incorporates additional types of content for validation based on "learned" trends and patterns in monitored data).

In some embodiments, the prompt installation module 118 may dynamically install at least one prompt into at least one software application within the computing device 102 based on the at least one data type for the validated data packet. In some embodiments, the prompt installation module 118 may install a particular prompt for each data type of the validated data packet. In certain embodiments, the at least one software application may refer to an artificial intelligence-based software application. In some embodiments, the prompt installation module 118 may have a set of instructions for subsequent action for particular data packets of a particular data type. In certain embodiments, the updates of the particular data packet may further update the prompt installation module 118 based on a result of the data trend analysis of the plurality of data packets. In some embodiments, the prompt installation module 118 may automatically reset the at least one prompt in response to at least one trigger condition being met. In certain embodiments, the automatic reset of the at least one prompt may refer to quarantining unauthorized and/or otherwise "flagged" data packages encountered during application function and updates to subsequent prompts. For example, the resetting of the prompt may dynamically assign usernames to corresponding IP addresses to subsequently track potential counterfeit users. In certain embodiments, the prompt installation module 118 may provide uses to report potential counterfeit users and/or IP addresses and other identifying tags and metatags to an external database associated with tracking counterfeit users. In certain embodiments, the prompt installation module 118 may quarantine noncompliant data packages for subsequent destruction and/or erasure. In certain embodiments, the prompt installation module 118 may store quantitative data associated with the validated data packet and the installed prompt for subsequent application activity.

In certain embodiments, the at least one action associated with the one or more installed prompts may refer to one or more security measures to monitor, track, and/or prevent cyberattacks from identified hackers in real-time. In certain embodiments, the at least one action associated with the one or more installed prompts may refer to one or more security measures to monitor, track, and/or prevent access to protected or covered data by unauthorized external hackers and/or internal users.

In some embodiments, the prompt installation module 118 may identify a source of a code injection and providing real-time remedies without impacting access or application functionality within the installed prompt by resetting the installed prompts after the trigger condition. In certain embodiments, the trigger conditions may refer to a completion of a discrete task, a regular recurring basis, a regular randomized basis, and/or after validation of a number of rests between application communications. In certain embodiments, the prompt installation module 118 may automatically reset the installed prompt associated with a particular type on a per-task basis and/or a randomized basis. The automatic reset of the installed prompt can also be based on pre-stored user preferences. A notification detailing the automatic reset of the installed prompt may be transmitted to the computing device 102, where the notification provides oversight and/or a master reset function. In some embodiments, the prompt installation module 118 may utilize the trained machine learning module 120 to erase (i.e., unlearn or scramble) one or more data packets of a particular data type within the plurality of data packets. In certain embodiments, the prompt installation module 118 tag (i.e., label) each data packet as a particular data type and destroy context surrounding the data packets of the particular data type, where once destroyed the data packet may be converted into sub-data. In certain embodiments, the prompt installation module 118 tag (i.e., label) each data packet as a particular data type and utilize the prompt installation module 118 to transfer the data packets of the particular data type to at least one pre-identified secure source. In certain embodiments, the transfer may include destruction of any data retained by one or more artificial intelligence applications.

In some embodiments, the prompt installation module 118 may utilize the trained machine learning module 120 to determine the at least one data type for each data packet of the plurality of data packets. In some embodiments, the prompt installation module 118 may utilize the trained machine learning module 120 to validate the at least one data type of a particular data packet based on the metadata associated with the external data source to form at least one validated data set. In some embodiments, the prompt installation module 118 may utilize the trained machine learning module 120 to dynamically install the at least one prompt into the at least one software application within the computing device 102 based on the at least one data type for the validated data packet. In some embodiments, the prompt installation module 118 may utilize the trained machine learning module 120 to automatically reset the at least one prompt in response to at least one trigger condition. In some embodiments, the prompt installation module 118 may utilize the trained machine learning module 120 to automatically erase one or more data packets associated with a particular data type within the plurality of data packets. In certain embodiments, the prompt installation module 118 tag (i.e., label) each data packet as a particular data type and utilize the prompt installation module 118 to transfer the data packets of the particular data type to at least one pre-identified secure source. In certain embodiments, the transfer may include destruction of any data retained by one or more artificial intelligence applications.

In some embodiments, the data output module 122 may output an identification of the plurality of data packets form the internal and/or external data source. In certain embodiments, the data output module 122 may output metadata associated each data packet within the plurality of data packets. In some embodiments, the data output module 122 may output a determination of a data type for each data packet. In some embodiments, the data output module 122 may output an installation of at least one prompt into a software application within the computing device 102. In some embodiments, the data output module 122 may output an instruction to perform at least one action associated with a data type of the validated data packet. In some embodiments, the data output module 122 may output a notification detailing a result of an automatic rest of the dynamically installed prompt in response to at least one trigger condition being met.

In some embodiments, the non-transient memory 110 may store the identification of the plurality of data packets from an internal and/or external data source. In some embodiments, the non-transient memory 110 may a determination of the data type of a particular data packet. In some embodiments, the non-transient memory 110 may store a validation of the data type of the particular data package to form a validated data packet. In some embodiments, the non-transient memory 110 may store an instruction to install a prompt into a software application within the computing device 102. In some embodiments, the non-transient memory 110 may store a notification detailing an automatic reset of the installed prompt in response to at least one trigger condition being met. In some embodiments, the non-transient memory 110 may store a result of an automatic erasure and/or transfer of one or more data packets of the plurality of data packets based on a particular data type.

In some embodiments, the processor 108 may identify a plurality of data packets from an internal and/or external data source. In certain embodiments, the plurality of data packets may include metadata associated with the internal and/or external data source. In some embodiments, the processor 108 may determine at least one data type for each data packet of the plurality of data packets. In some embodiments, the processor 108 may validate the at least one data type of a particular data package based on the metadata. In certain embodiments, the validation of the at least one data type to form at least one validated data packet. In some embodiments, the processor 108 may dynamically install at least one prompt into a software application within a computing device 102 based on the at least one data type for the validated data packet. In some embodiments, the processor 108 may facilitate a performance of at least one action associated with the data type of the at least one validated data packet. In some embodiments, the processor 108 may automatically reset the at least one prompt in response to at least one trigger condition. In some embodiments, the processor 108 may automatically erase and/or transfer a particular data packet of the plurality of data packets of a particular data type.

In some embodiments, the prompt installation module 118 may be trained to identify and categorize data packets to achieve the intended result of a specific task without including computing system operation and/or authorized user access to the required data. In certain embodiments, the prompt installation module 118 may identify and categorize the plurality of data packets by at least one data source and/or at least one data content, where the data source may segregate data based on user generation and/or an IP address associated with the at least one data packet and the at least one data content may segregate data based on the information being communicated regardless of source. In certain embodiments, the data content categorization may apply when specific types of data require enhanced internal authorization to access, handle, and/or store data. One or more examples of these type of data categorization may be presented in the following: the prompt installation module 118 may receive a list of prohibited IP addresses and/or emails, and any data introduced into the computing system environment from those sources may be automatically segregated for erasure before data access would be provided to internal users. In certain embodiments, the prompt installation module 118 may also receive criteria for acceptable data packages from one or more external sources and/or add the associated IP address and/or email to the prohibited list in response to a rejection, which may include presence of non-native language(s) in message(s) and/or attachment(s), and the presence of general and/or specific hyperlinks embedded within the email message(s) and/or attachment(s). In certain embodiments, the prompt installation module 118 may also tag all data provided by specific external sources and/or erase such data from the memory once training would be complete in response to the prompt installation module 118 being trained with sensitive external data (e.g., patentable technology, biological data such as genomes, chemical data, etc.). In certain embodiments, the prompt installation module 118 may also categorize data by content if both internal and external users as contributing data for subsequent training of the prompt installation module 118, categorize and erase tagged data in accordance with established prompts. In certain embodiments, the prompt installation module 118 may also erase all data generated by application users (e.g., messages) after task completion (i.e., message encryption and send) by managing data generated by an encrypted messaging application. In certain embodiments, the prompt installation module 118 may also perform tasks using data that may be subject to legal protections from access and/or release, including but not limited to, patient data covered by HIPAA and data that may not be classified but would be covered from broad disclosure by federal regulations, based on identifiers for sensitive data created by internal users then erase that data from the application upon task completion. In certain embodiments, the prompt installation module 118 may also categorize data by source if the data being processed by the application would be received from a specific internal source, such as a designated database and/or separate internal application. In certain embodiments, the prompt installation module 118 may also segregate the data during handling prior to transfer in situations where internal users create or otherwise embed sensitive data within the computing programming environment and/or provide the user with a notice regrading the status of the data prior to the transfer (e.g., storage, deletion, and/or send to an external party). In certain embodiments, the prompt installation module 118 may also limit sensitive data access to specific named internal users in situations where users may have unauthorized systemic access to sensitive and/or protected data (e.g., CDI, CUI, HIPAA, etc.); and the prompt installation module 118 may limit access to said data to specific named authorized users in situations where internal users may have unauthorized systemic access to sensitive and/or protected data (e.g., CDI, CUI, HIPAA, etc.).

Figure 2:
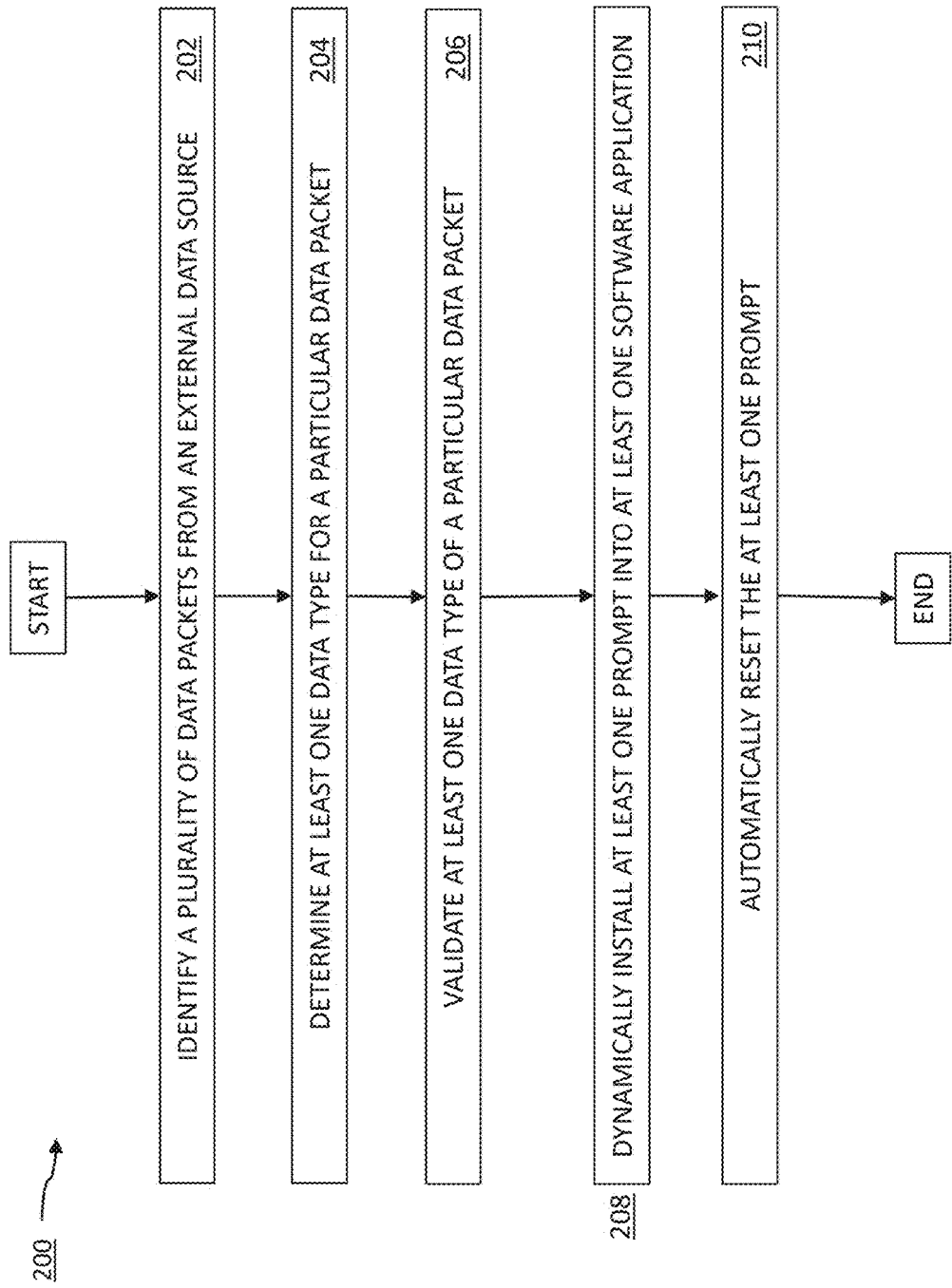
FIG. 2 is a flowchart illustrating operational steps for dynamically installing at least one prompt into at least one artificial intelligence-based software application within a computing device, in accordance with one or more embodiments of the present disclosure.

FIG. 2 is a flowchart 200 illustrating operational steps for dynamically installing at least one prompt into at least one artificial intelligence-based software application within a computing device 102, in accordance with one or more embodiments of the present disclosure.

In step 202, the illustrative program engine 104 within the computing device 102 may be programmed to identify a plurality of data packets from an internal and/or external data source. In some embodiments, the illustrative program engine 104 may identify a plurality of data packets from the internal and/or external data source, where the plurality of data packets may include metadata associated with the internal and/or external data source. In certain embodiments, the plurality of data packets may refer to a container format for describing a coherent collection of data in a single package. In some embodiments, the metadata may include internet protocol (IP) addresses, base-issued specifications, content of a data package, and a size of a data package. In some embodiments, the external data source may refer to an externally installed application capable of encoding an original text message generated by a user through one or more unique translation keys. In some embodiments, the prompt installation module 118 may identify a plurality of data packets from the internal and/or external data source, where the plurality of data packets may include metadata associated with the internal and/or external data source.

In step 204, the illustrative program engine 104 may determine at least one data type for a particular data packet. In some embodiments, the illustrative program engine 104 may utilize a trained machine learning module 120 to determine the at least one data type for the particular data packet of the plurality of data packet. In certain embodiments, the particular data type may refer to a type data associated with the installation and set-up of a computing device 102, where the types may include static data and fluid data. In certain embodiments, the static data may refer to data being monitored for unauthorized or unscheduled alteration during task-based activities. For example, the static data may refer to authorized sources of data, source code, and/or hard-coded prompts. In certain embodiments, the hard-coded prompts may refer to hard-coded artificial intelligence-based prompts. In certain embodiments, the fluid data may refer to data being monitored for source, size and format. For example, the fluid data may refer to user-entered text, randomized external data; and data generated by and/or for unauthorized revision not required for subsequent task execution. In certain embodiments, the prompt installation module 118 may determine the data type by analyzing each data packet for specific data; predicting a modification to the specific data in response to a condition; and verifying the modification via execution of the condition, where the condition may refer to a determination of the specific data being authorized or randomized. In certain embodiments, the analysis may refer to a trend analysis performed on the plurality of data packets and identify outliers based on spikes in size of particular data packets and/or other specific recurring data characteristics. In some embodiments, the prompt installation module 118 may utilize the trained machine learning module 120 to determine the at least one data type for the particular data packet of the plurality of data packet.

In step 206, the illustrative program engine 104 may validate the at least one data type of a particular data packet. In some embodiments, the illustrative program engine 104 may validate the at least one data type of the particular data packet based on the metadata associated with the internal and/or external data source. In certain embodiments, the validation of the at least one data type of the particular data packet may form a validated data package. In certain embodiments, the validated data packet may contain validated content (i.e., symbol check, content tags or queues, etc.) and relative size of the data packet. In some embodiments, the prompt installation module 118 may validate the at least one data type of the particular data packet based on the metadata associated with the internal and/or external data source.

In step 208, the illustrative program engine 104 may dynamically install at least one prompt into at least one software application. In some embodiments, the illustrative program engine 104 may dynamically install the at least one prompt into the software application within the computing device 102 based on the at least one data type for the validated data packet. In some embodiments, the at least one prompt may be configured to facilitate a performance of at least one action associated with the data type of the validated data packet. In certain embodiments, the at least one prompt may refer to common language directives within programmable AI functions. In some embodiment, the illustrative program engine 104 may install a particular prompt for each data type of the validated data packet. In certain embodiments, the at least one software application may refer to an artificial intelligence-based software application. In some embodiments, the illustrative program engine 104 may have a set of instructions for subsequent action for particular data packets of a particular data type. In some embodiments, the prompt installation module 118 may dynamically install the at least one prompt into the software application within the computing device 102 based on the at least one data type for the validated data packet.

In step 210, the illustrative program engine 104 may automatically reset the at least one prompt. In some embodiments, the illustrative program engine 104 may automatically reset the at least one installed prompt in response to at least one trigger condition being met. In some embodiments, the automatic reset of the at least one prompt may refer to quarantining unauthorized and/or covered data packages encountered during application function and updates to subsequent prompts. For example, the resetting of the prompt may dynamically assign usernames to corresponding IP addresses to subsequently track potential counterfeit users. A notification detailing the automatic reset of the installed prompt may be transmitted to the computing device 102, where the notification provides oversight and/or a master reset function. In some embodiments, the illustrative program engine 104 may identify a source of a code injection and providing real-time remedies without impacting access or application functionality within one or more installed prompts by automatically resetting the one or more installed prompts in response to an identification of the trigger condition. In certain embodiments, the trigger conditions may refer to a completion of a discrete task, a regular recurring basis, a regular randomized basis, and/or after validation of a number of rests between application communications. In certain embodiments, the illustrative program engine 104 may automatically reset the one or more installed prompts associated with a particular type on a per-task basis and/or a randomized basis. The automatic reset of the one or more installed prompts may be based on pre-stored user preferences. In some embodiments, the prompt installation module 118 may automatically reset the at least one installed prompt in response to at least one trigger condition being met.

In some embodiments, the illustrative program engine 104 may utilize the trained machine learning module 120 to erase (i.e., unlearn or scramble) one or more data packets of a particular data type within the plurality of data packets. In certain embodiments, the illustrative program engine 104 may tag (i.e., label) each data packet as a particular data type and destroy context surrounding the data packets of the particular data type, where once destroyed the data packet may be converted into sub-data. In certain embodiments, the at least one action associated with the one or more installed prompts may refer to one or more security measures to monitor, track, and/or prevent cyberattacks from identified hackers in real-time. In certain embodiments, the at least one action associated with the one or more installed prompts may refer to one or more security measures to monitor, track, and/or prevent access to tagged data packets by unauthorized internal and/or external users via disassembly of learned data to subdata.

Figure 3A:
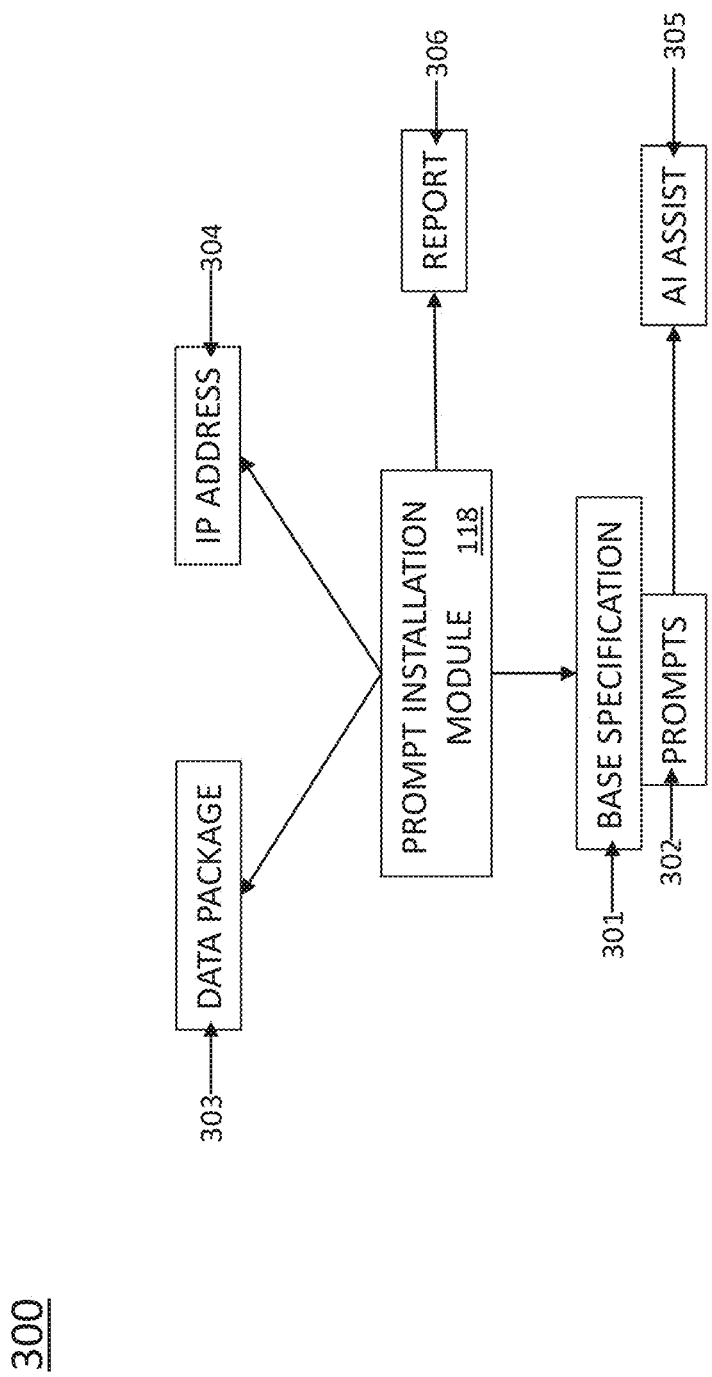
FIGS. 3A-3C depict examples of a prompt installation module performing one or more actions associated with a data type of a data packet, in accordance with one or more embodiments of the present disclosure.
Figure 3B:
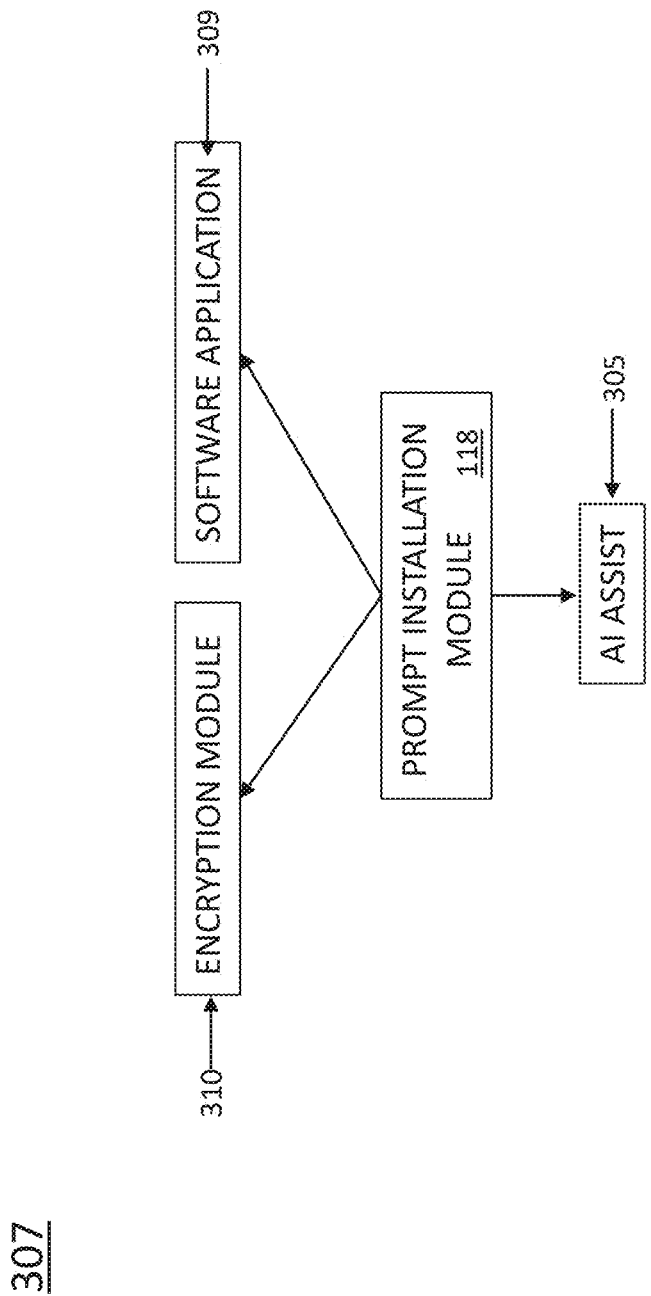
Figure 3C:
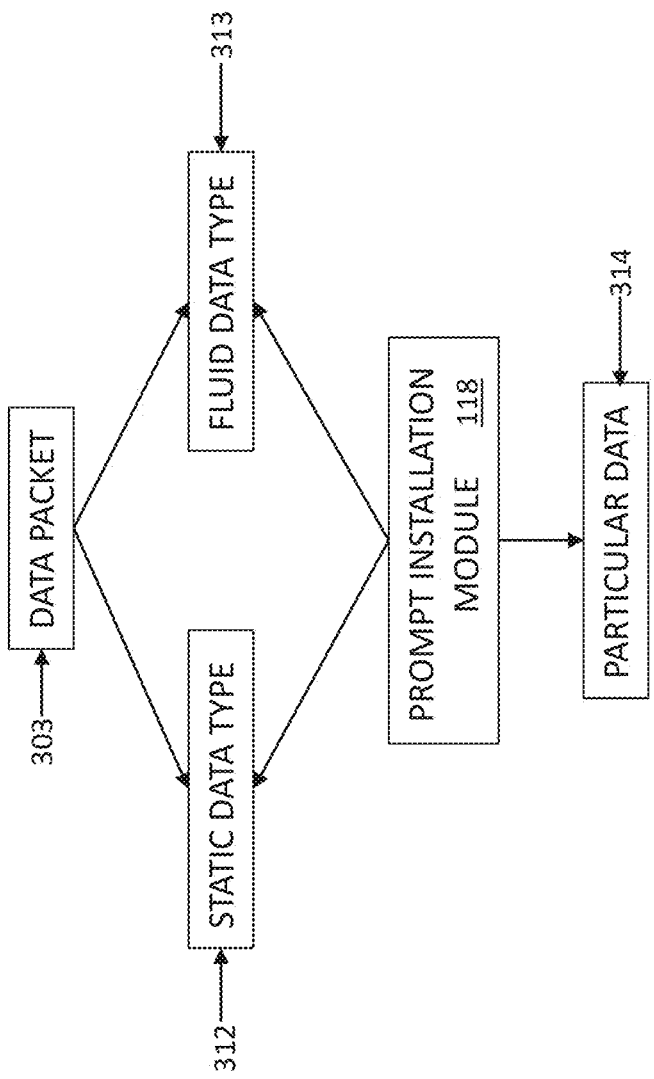

FIGS. 3A-3C depict examples of the prompt installation module 118 performing one or more actions associated with a data type of a data packet, in accordance with one or more embodiments of the present disclosure.

FIG. 3A is a depiction 300 of the prompt installation module 118 capable of storing one or more base-issued specifications 301 and pre-stored prompts 302 associated with one or more data types for the plurality of data packages 303. In certain embodiments, these prompts 302 may be based on IP addresses 304 and data packages 303 from internal and/or external data sources. In some embodiments, the prompt installation module 118 may utilize a trained machine learning module 120 and/or one or more artificial intelligence assist programs 305 to install a prompt for a software application. In certain embodiments, a report 306 is generated in response to the installation of the prompt.

FIG. 3B is a depiction 307 of prompt installation module 118 capable of automatically resetting one or more installed prompts in response to metadata from an internal and/or external data source, where the prompt installation module 118 may utilize one or more artificial intelligence assist programs 305 to analyze the data source 308 and output results of the automatic reset of the software application 309 via an encryption module 310 to perform subsequent actions to the automatic reset.

FIG. 3C is a depiction 311 of the prompt installation module 118 capable of identifying one or more data types, specifically a static data type 312 and a fluid data type 313, within each data packet 303 of the plurality of data packets. In some embodiments, the prompt installation module 118 may determine particular data 314 from the static data type 312 and the fluid data type 313 associated with a particular data type within a particular data packet to be destroyed and/or erased.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others. For the purposes of this disclosure, a quantum computing device is considered to be a computing device.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, quantum computers, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, quantum computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11 ™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the prompt installation module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transactions/users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., tokenized PAN numbers, etc.) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 4:
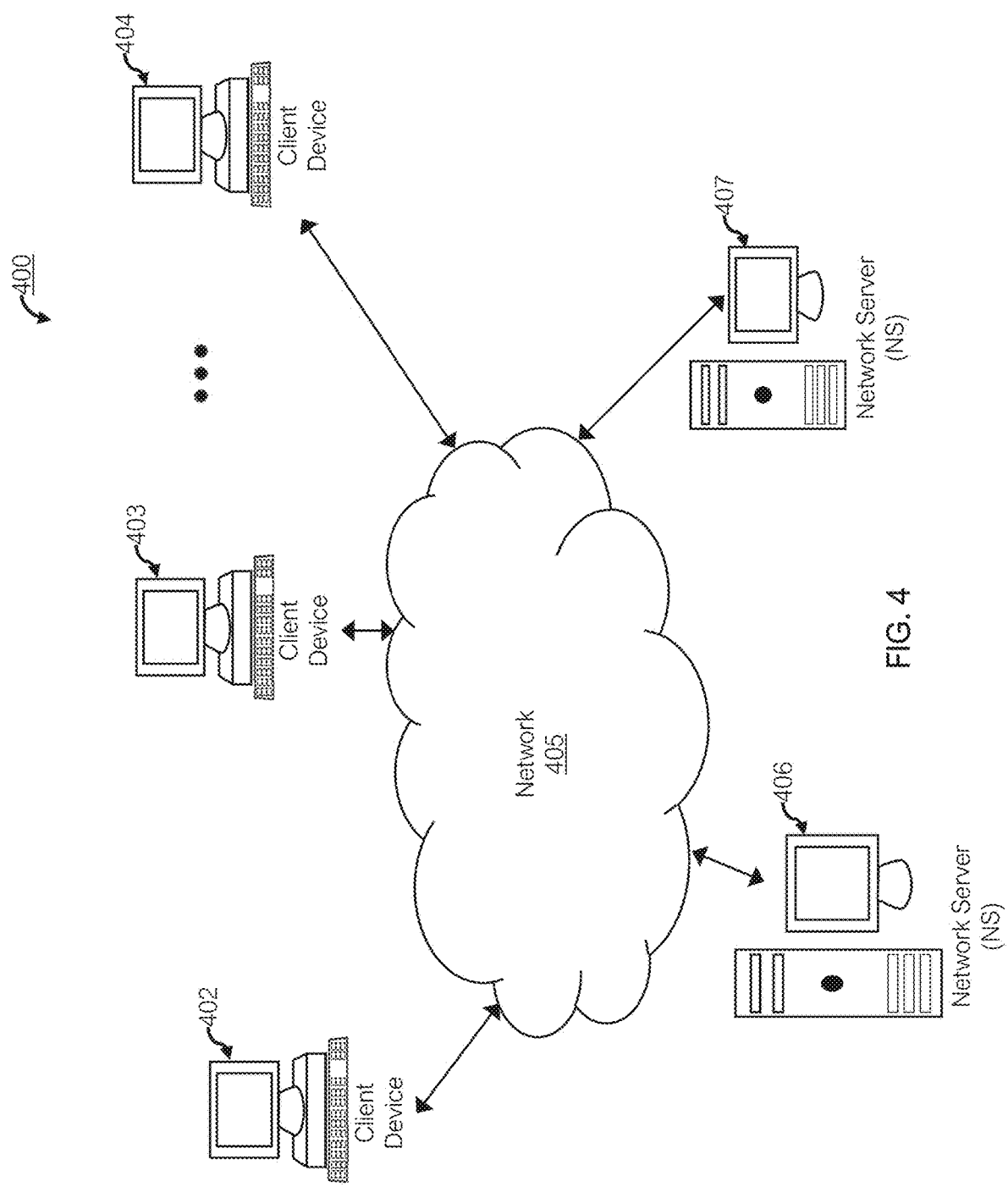
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates various strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the prompt installation module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, quantum computers, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may run one or more applications, such as Internet browsers, mobile applications, voice calls, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information (e.g., transactions, VCNs, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
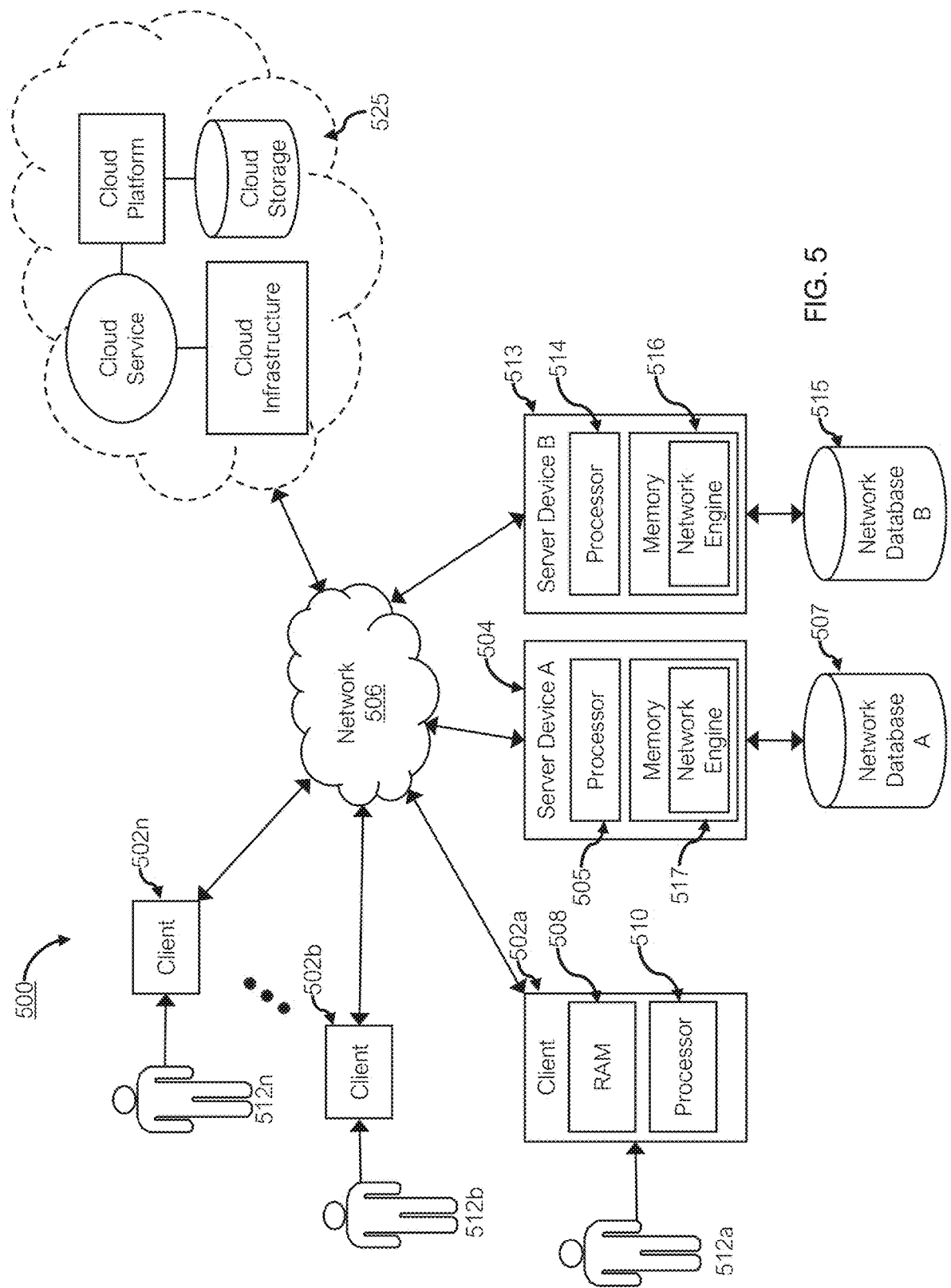
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
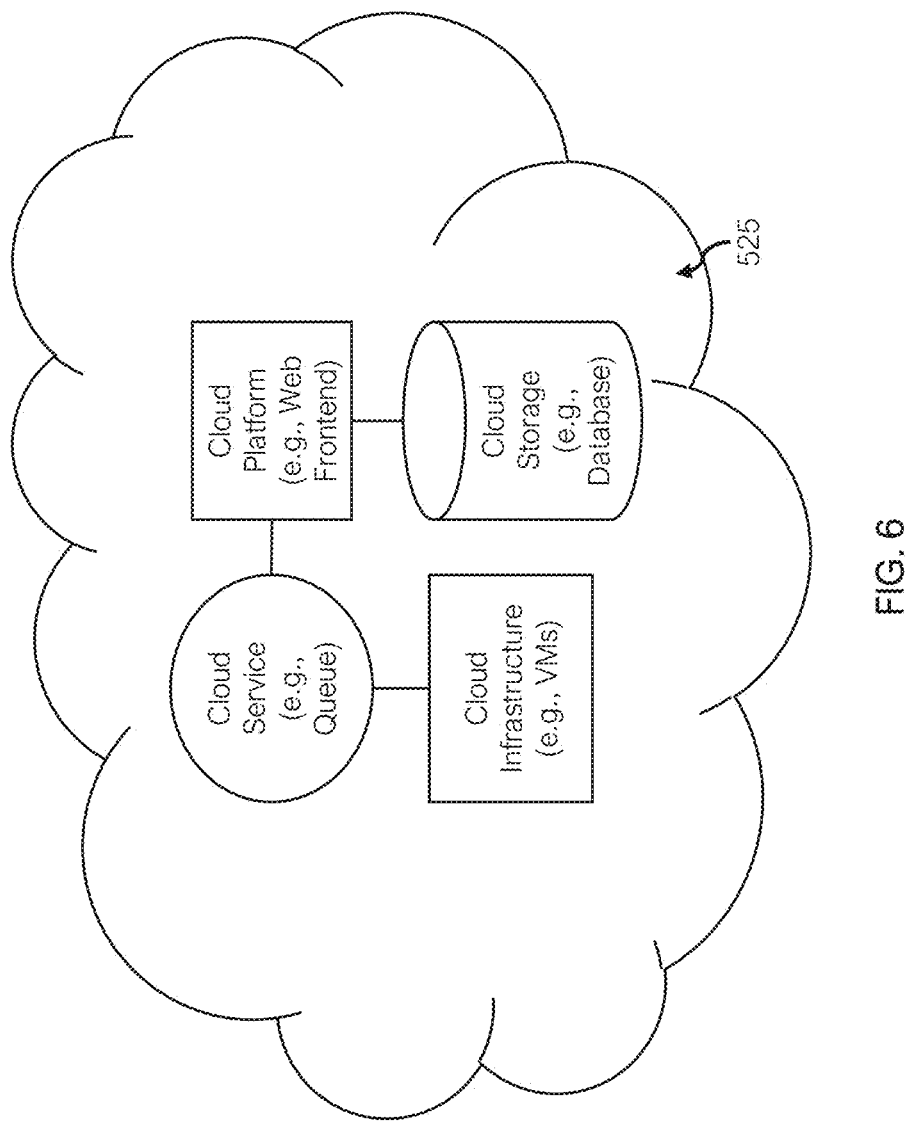
FIGS. 6 and 7 are diagrams illustrating implementations of cloud computing architecture/aspects with respect to which the disclosed technology may be specifically configured to operate, in accordance with one or more embodiments of the present disclosure.
Figure 7:
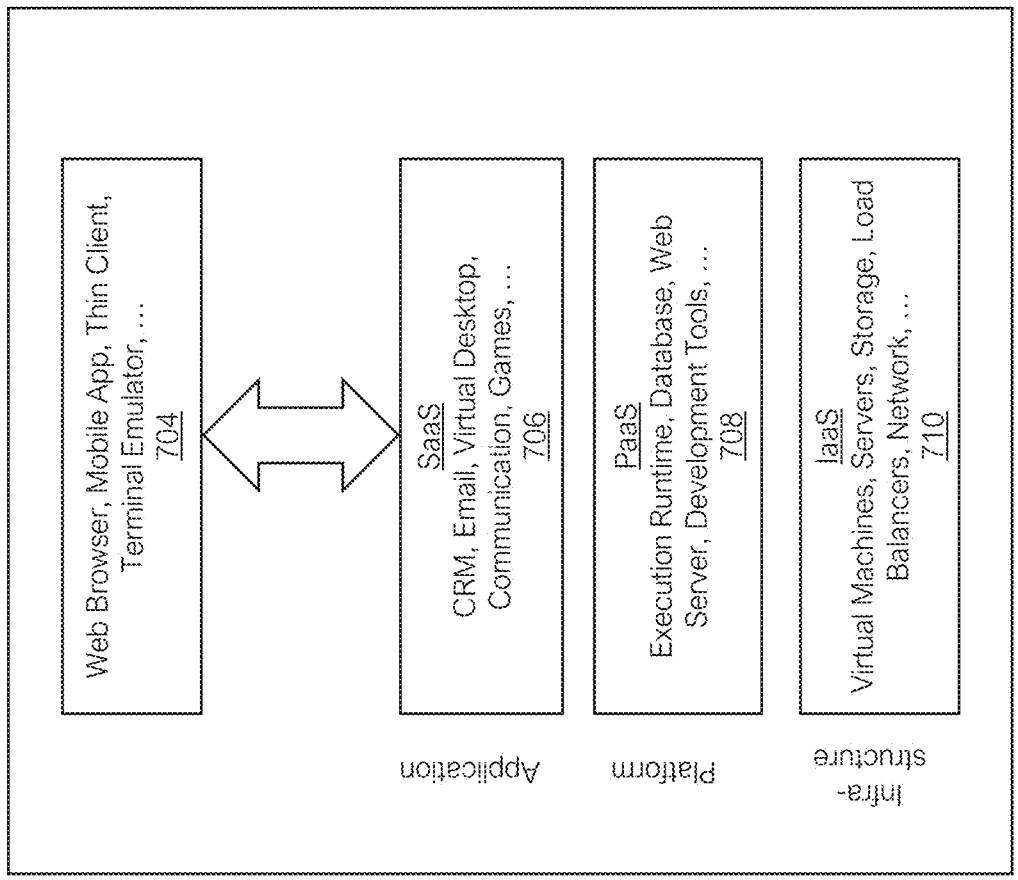

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, an artificial recurrent neural network model, a long short-term memory ("LSTM") model, and a distributed long short-term memory ("DLSTM") model, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A computer-implemented method may include: identifying, by a processor, a plurality of data packets from an external data source, the plurality of data packets comprising metadata associated with the internal and/or external data source; determining, by the processor, at least one data type for each data packet of the plurality of data packets, validating, by the processor, the at least one data type of the data packet based on the metadata associated with the internal and/or external data source to form at least one validated data packet; dynamically installing, by the processor, based on the at least one data type for the validated data packet, at least one prompt into at least one artificial intelligence-based software application within a computing device, wherein the at least one prompt is configured to facilitate a performance of at least one action associated with the data type of the at least one validated data packet; and automatically resetting, by the processor, the at least one prompt in response to at least one trigger condition being met.

Clause 2. The method according to clause 1, further including automatically erasing (by, as a non-limiting example, disassembling data into unrecognizable component subdata) one or more data packets of the plurality of data types associated with a particular data type.

Clause 3. The method according to clause 1 or 2, where the plurality of data packets includes metadata associated with an internal data source and the external data source.

Clause 4. The method according to clause 1, 2 or 3, where the at least one data type includes static data and fluid data.

Clause 5. The method according to clause 1, 2, 3 or 4, where the static data includes data being monitored for unauthorized or unscheduled alteration during task-based activities.

Clause 6. The method according to clause 1, 2, 3, 4 or 5, where the fluid data includes data being monitored for source, size and format whether derived from the external or an internal source.

Clause 7. The method according to clause 1, 2, 3, 4, 5 or 6, where the at least one validated data packet includes validated content and validated relative size of the at least one data packet.

Clause 8. The method according to clause 1, 2, 3, 4, 5, 6 or 7, where the validated content includes a symbol check, one or more particular content tags, and a plurality of queues associated with the metadata from the external data source.

Clause 9. The method according to clause 1, 2, 3, 4, 5, 6, 7, or 8, where the at least one prompt is configured to facilitate a performance of at least one action associated with the data type of the at least one validated data packet.

Clause 10. The method according to clause 1, 2, 3, 4, 5, 6, 7, 8 or 9, where the at least one action includes one or more security measures to monitor, track, and/or prevent cyberattacks from identified hackers in real-time.

Clause 11. The method according to clause 1, 2, 3, 4, 5, 6, 7, 8, 9 or 10, where the at least one prompt includes one or more common language directives within programmable artificial intelligence functions.

Clause 12. The method according to clause 1, 2, 3, 4, 5, 6, 7, 8, 9, 10 or 11, where the dynamic installing the at least one prompt includes dynamically installing a particular prompt for each data type of the validated data packet.

Clause 13. The method according to clause 1, 2, 3, 4, 5, 6, 7, 8, 9, 10, 11 or 12, further including labelling each data packet as a particular data type and destroying metadata associated with the data packets of the particular data type.

Clause 14. A computer-implemented method may include: identifying, by a processor, a plurality of data packets from an external data source, the plurality of data packets comprising metadata associated with the internal and/or external data source; determining, by the processor, at least one data type for each data packet of the plurality of data packets, validating, by the processor, the at least one data type of the data packet based on the metadata associated with the internal and/or external data source to form at least one validated data packet; dynamically installing, by the processor, based on the at least one data type for the validated data packet, at least one prompt into at least one artificial intelligence-based software application within a computing device, wherein the at least one prompt is configured to facilitate a performance of at least one action associated with the data type of the at least one validated data packet; automatically resetting, by the processor, the at least one prompt in response to at least one trigger condition being met; and automatically erasing one or more data packets of the plurality of data types associated with a particular data type.

Clause 15. The method according to clause 14, where the automatically erasing the one or more data packets comprises disassembling data into unrecognizable component subdata in real-time.

Clause 16. The method according to clause 14 or 15, where the plurality of data packets includes metadata associated with an internal data source and the external data source.

Clause 17. The method according to clause 14, 15, or 16, where the at least one data type includes static data and fluid data.

Clause 18. The method according to clause 14, 15, 16, or 17, where the at least one prompt is configured to facilitate a performance of at least one action associated with the data type of the at least one validated data packet.

Clause 19. The method according to clause 14, 15, 16, 17, or 18, further including labelling each data packet as a particular data type and destroying metadata associated with the data packets of the particular data type.

Clause 20. A system may include: a non-transient computer memory, storing software instructions; at least one or more components of at least one processor configured to execute the software instructions that cause the at least one processor to perform steps to: identify a plurality of data packets from an internal data source, the plurality of data packets including metadata associated with the internal data source; determine at least one data type for each data packet of the plurality of data packets; validate the at least one data type of the data packet based on the metadata associated with the internal data source to form at least one validated data packet; dynamically install based on the at least one data type for the validated data packet, at least one prompt into at least one artificial intelligence-based software application within a computing device, where the at least one prompt is configured to facilitate a performance of at least one action associated with the at least one data type of the at least one validated data packet; and automatically reset the at least one prompt in response to at least one trigger condition being met.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
   identifying, by a processor, a plurality of data packets from an external data source, the plurality of data packets comprising metadata associated with the internal and/or external data source;
   determining, by the processor, at least one data type for each data packet of the plurality of data packets;
   validating, by the processor, the at least one data type of the data package based on the metadata associated with the external data source to form at least one validated data packet,
      wherein the at least one validated data packet comprises validated content and validated relative size of the at least one data packet;
   dynamically installing, by the processor, based on the at least one data type for the validated data packet, at least one prompt into at least one artificial intelligence-based software application within a computing device; and
   automatically resetting, by the processor, the at least one prompt in response to at least one trigger condition being met.

2. The method of claim 1, further comprising automatically erasing one or more data packets of the plurality of data types associated with a particular data type.

3. The method of claim 1, wherein the plurality of data packets comprises metadata associated with an internal data source and the external data source.

4. The method of claim 1, wherein the at least one data type comprises static data and fluid data.

5. The method of claim 4, wherein the static data comprises data being monitored for unauthorized or unscheduled alteration during task-based activities.

6. The method of claim 4, wherein the fluid data comprises data being monitored for source, size and format whether derived from the external or an internal source.

7. The method of claim 1, wherein the validated content comprises a symbol check, one or more particular content tags, and a plurality of queues associated with the metadata from the external data source.

8. The method of claim 1, wherein the at least one prompt is configured to facilitate a performance of at least one action associated with the data type of the at least one validated data packet.

9. The method of claim 8, wherein the at least one action comprises one or more security measures to monitor, track, and/or prevent cyberattacks from identified hackers in real-time.

10. The method of claim 1, wherein the at least one prompt comprises one or more common language directives within programmable artificial intelligence functions.

11. The method of claim 1, wherein the dynamic installing the at least one prompt comprises dynamically installing a particular prompt for each data type of the validated data packet.

12. The method of claim 1, further comprising labelling each data packet as a particular data type and destroying metadata associated with the data packets of the particular data type.

13. A computer implemented method comprising:
   identifying, by a processor, a plurality of data packets from an external data source, the plurality of data packets comprising metadata associated with the internal and/or external data source;

determining, by the processor, at least one data type for each data packet of the plurality of data packets;

validating, by the processor, the at least one data type of the data package based on the metadata associated with the external data source to form at least one validated data packet;

dynamically installing, by the processor, based on the at least one data type for the validated data packet, at least one prompt into at least one artificial intelligence-based software application within a computing device;

automatically resetting, by the processor, the at least one prompt in response to at least one trigger condition being met; and automatically erasing one or more data packets of the plurality of data types associated with a particular data type.

14. The method of claim 13, wherein the automatically erasing the one or more data packets comprises disassembling data into unrecognizable component subdata in real-time.

15. The method of claim 13, wherein the plurality of data packets comprises metadata associated with an internal data source and the external data source.

16. The method of claim 13, wherein the at least one data type comprises static data and fluid data.

17. The method of claim 13, wherein the at least one prompt is configured to facilitate a performance of at least one action associated with the data type of the at least one validated data packet.

18. The method of claim 13, further comprising labelling each data packet as a particular data type and destroying metadata associated with the data packets of the particular data type.

19. A system comprising:
a non-transient computer memory, storing software instructions;
at least one or more components of at least one processor configured to execute the software instructions that cause the at least one processor to perform steps to:
identify a plurality of data packets from an internal data source, the plurality of data packets including metadata associated with the internal data source;
determine at least one data type for each data packet of the plurality of data packets;
validate the at least one data type of the data package based on the metadata associated with the internal data source to form at least one validated data packet, wherein the at least one validated data packet comprises validated content and validated relative size of the at least one data packet;
dynamically install based on the at least one data type for the validated data packet, at least one prompt into at least one artificial intelligence-based software application within a computing device, where the at least one prompt is configured to facilitate a performance of at least one action associated with the at least one data type of the at least one validated data packet; and
automatically reset the at least one prompt in response to at least one trigger condition being met.

* * * * *